G. BURSON.
SPRING TIRE.
APPLICATION FILED JULY 20, 1910.
1,026,201.
Patented May 14, 1912.
2 SHEETS—SHEET 1.
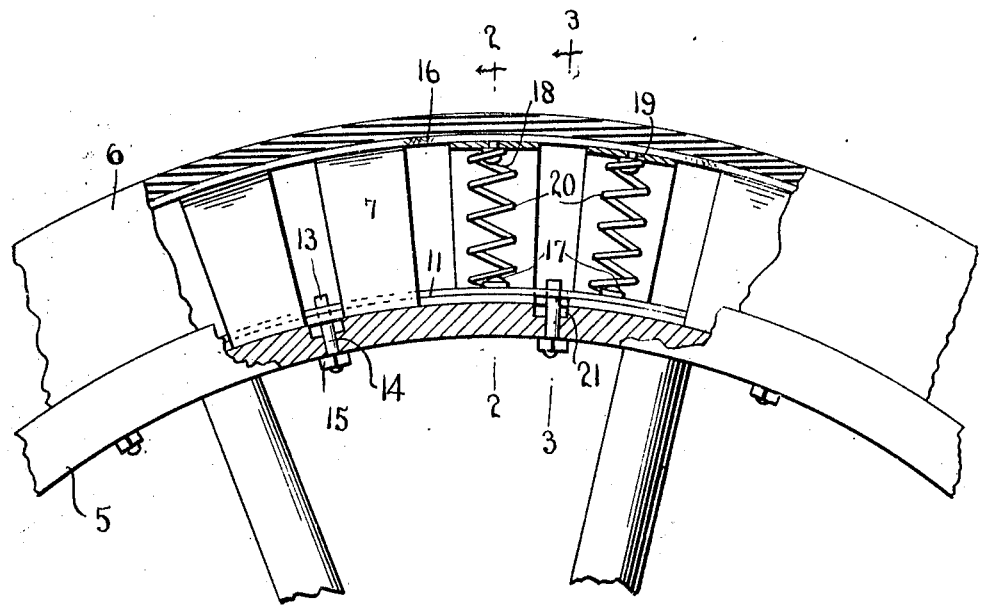
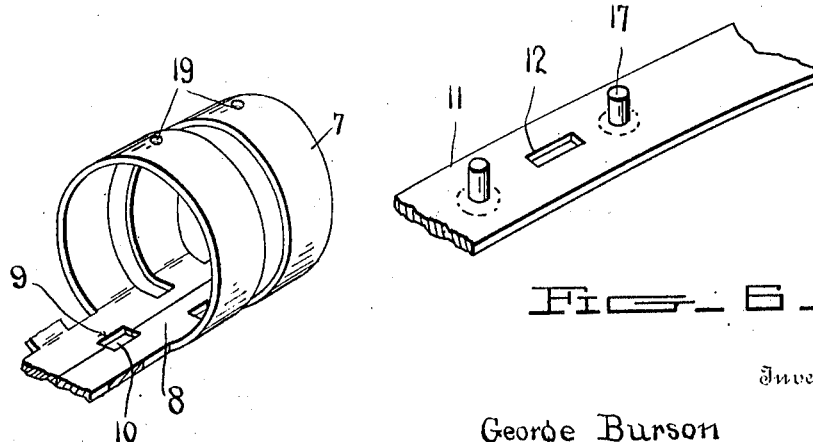
Witnesses
L. B. James
O. M. Havell
Inventor
George Burson
By Herrick & Herrick
Attorneys G. BURSON.
SPRING TIRE.
APPLICATION FILED JULY 20, 1910.
1,026,201.
Patented May 14, 1912.
2 SHEETS—SHEET 2.
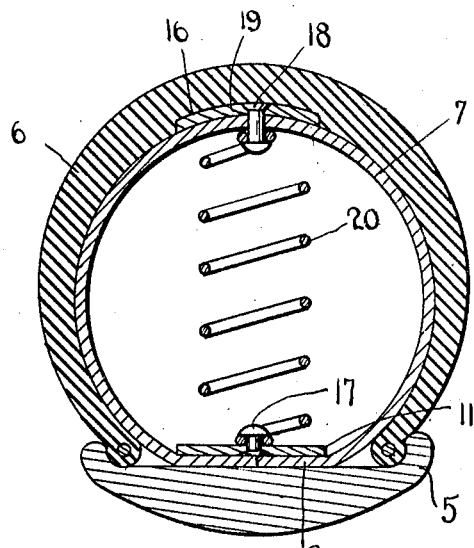
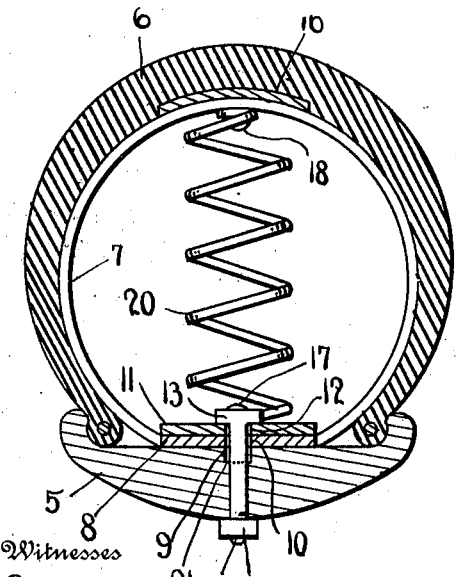
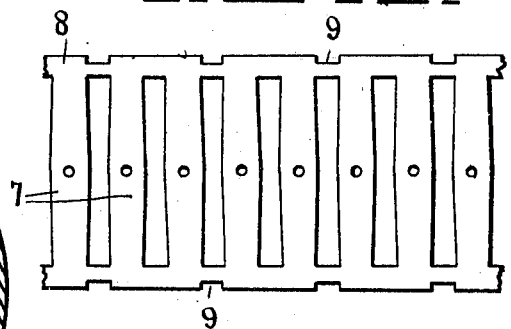
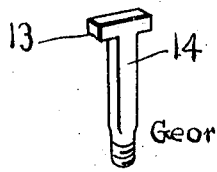
Inventor
George Burson
By Herrick & Herrick
Attorneys
Witnesses
L. B. James

UNITED STATES PATENT OFFICE.

GEORGE BURSON, OF WINAMAC, INDIANA.

SPRING-TIRE.

1,026,201.

Specification of Letters Patent. Patented May 14, 1912.

Application filed July 20, 1910. Serial No. 572,947.

*To all whom it may concern:*

Be it known that I, GEORGE BURSON, citizen of the United States, residing at Winamac, in the county of Pulaski and State of Indiana, have invented certain new and useful Improvements in Spring-Tires, of which the following is a specification.

My invention relates to spring tires, of the type in which an outer tube or shoe is held in expanded condition by means of a metallic spring element therein, and is designed to provide a tire of this kind, especially adapted for vehicle use, which is simple and cheap of manufacture, and whose resiliency is increased by the particular construction.

To various ends set out, the invention consists of the elements, combinations, and arrangements of parts, all as will be hereinafter fully set forth and succinctly defined in the annexed claim.

In the accompanying drawings, which are to be taken as a part of this specification and in which I have shown a merely preferred form of embodiment of the invention, Figure 1 is a side elevation, partly in section of part of a wheel equipped with the invention; Fig. 2 is a sectional view on the line 2—2 of Fig. 1; Fig. 3 is a similar view on line 3—3 of Fig. 1; Fig. 4 is a detail view of the plate from which the circular springs are formed; Fig. 5 is a detail perspective view of a section of the plate after it has been formed ready for use; Fig. 6 is a detail perspective view of the retaining plate and Fig. 7 is a detail perspective view of a retaining bolt employed.

Referring more particularly to the drawings, the numeral 5 designates the rim of an ordinary automobile wheel on which is suitably secured an outer casing or the like 6 which is held in an extended position by a plurality of radial projecting substantially circular springs 7, the meeting ends of which are connected together as at 8, thereby maintaining the projecting springs in a spaced position, thus avoiding the possibility of them becoming entangled or allowing them to shift from their relative position. Formed in the meeting edges of the spring at intervals are cut out portions 9 which when brought together form slots 10. Surrounding the outer face of the meeting ends of the circular spring is a circular band 11 in which are formed slots 12, corresponding to slots 10 and when placed in operative position they are adapted to be in alinement therewith to allow the elongated heads 13 of a bolt 14 to be inserted therethrough and then turned at right angles across the slot 12, the slots in the circular band 11 are cut so as to be between the circular springs, the bolts 14 to be made to extend entirely through the rim of the wheel, and the nuts 15 tightened to retain the said band 11 and the circular springs 7 securely against the periphery of the rim, the band 11 is to have studs or lugs 17 either riveted or otherwise fastened thereto corresponding with the center of each circular spring and prolonged a suitable distance within the circle to allow the inner end of the coil springs 20 to be held in place.

Surrounding the outer surface of the circular springs is a circular band 16 of leather or any usual or preferred material of the necessary width firmly riveted or otherwise fastened to each of the circular springs, as at 18 and 19 the heads of the rivets to be prolonged so as to project a sufficient distance within the circle to allow the outer ends of the coil spring 20 to be held in place. It will be noted that in the rim is formed or otherwise made a plurality of counter sunk slots 21 which are adapted to receive the heads of the bolts while the spring and adjacent parts are being placed in position after which said bolts are passed through said slots as stated.

It is to be understood that this invention is not to be limited to the specific forms, materials, or relations, other than those set out in the claims, except such as may be necessary to the practical embodiment of the invention there defined.

What I claim is:

In a spring tire, the combination with a wheel rim, of an inclosing casing engaged therewith, a plurality of spaced and bowed spring members located within said casing and holding said casing in distended position, opposed portions connecting the ends of all of said spring members to space and hold them in position, and notches formed in the edges of said portions to form slots when said portions are brought edge to edge, an overlying retaining plate extending entirely around the rim and having elongated slots formed therethrough which register with the first mentioned slots, and T-bolts, the length of the heads of which exceeds the width but not the length of said slots, said bolts passing through the retaining plate, the connecting portions and the rim.

In testimony whereof I affix my signature in presence of two witnesses.

GEORGE BURSON.

Witnesses:
J. R. MEEKS,
LEWIS ROWAN.